(12) United States Patent
Minch et al.

(10) Patent No.: US 9,187,651 B2
(45) Date of Patent: Nov. 17, 2015

(54) WATERBORNE COATINGS, COMPOSITIONS, AND METHODS THEREOF THAT PROVIDE IMPROVED CORROSION PROTECTION

(71) Applicant: The Lubrizol Corporation, Wickliffe, OH (US)

(72) Inventors: Britt A. Minch, Painesville Township, OH (US); Gregory E. Moran, Painesville, OH (US); David Boothe, Mentor, OH (US); Daniel W. Hunt, Hudson, OH (US); Ben Faber, Cleveland Heights, OH (US); Pedro J. Velis, Coquimbo (CL)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 14/381,622

(22) PCT Filed: Mar. 1, 2013

(86) PCT No.: PCT/US2013/028560
§ 371 (c)(1),
(2) Date: Aug. 28, 2014

(87) PCT Pub. No.: WO2013/134062
PCT Pub. Date: Sep. 12, 2013

(65) Prior Publication Data
US 2015/0053111 A1    Feb. 26, 2015

Related U.S. Application Data

(60) Provisional application No. 61/608,269, filed on Mar. 8, 2012.

(51) Int. Cl.
| | | |
|---|---|---|
| C09D 5/08 | (2006.01) | |
| C08K 5/00 | (2006.01) | |
| C08K 5/09 | (2006.01) | |
| C08K 5/17 | (2006.01) | |

(52) U.S. Cl.
CPC ............... C09D 5/086 (2013.01); C08K 5/005 (2013.01); C08K 5/09 (2013.01); C08K 5/17 (2013.01)

(58) Field of Classification Search
CPC ............ C09D 5/086; C08K 5/17; C08K 5/09; C08K 5/005
USPC ................... 106/14.13, 14.14, 14.42, 14.44; 252/388, 392
See application file for complete search history.

(56) References Cited

U.S. PATENT DOCUMENTS

| | | | | |
|---|---|---|---|---|
| 4,354,881 A | * | 10/1982 | Tanikawa et al. | ............. 148/252 |
| 4,820,344 A | | 4/1989 | Juergen et al. | |
| 2007/0001150 A1 | * | 1/2007 | Hudgens et al. | ............. 252/390 |

FOREIGN PATENT DOCUMENTS

| | | | |
|---|---|---|---|
| EP | 0553962 A1 | | 8/1993 |
| EP | 1038933 A1 | | 9/2000 |
| EP | 1041174 A1 | | 10/2000 |
| JP | 2004250507 A | * | 9/2004 |
| JP | 2007016167 | | 1/2007 |
| JP | 2007016167 A | | 1/2007 |

OTHER PUBLICATIONS

Technical Data Sheet "Invista Specialty Intermediates Corfree ® M1 dibasic acid mixture", www.intermediates.invista.com, (2008).*
Written Opinion of the Corresponding International Application No. PCT/US2013/028560 dated Mar. 1, 2013.
Search Report of the Corresponding International Application No. PCT/US2012/028560 dated Mar. 1, 2013.
Corresponding International Publication No. WO2013/134062 A1 Published Sep. 12, 2013.

* cited by examiner

*Primary Examiner* — Anthony J Green
(74) *Attorney, Agent, or Firm* — David M. Shold; Christopher D. Hilker; Teresan W. Gilbert

(57) ABSTRACT

The invention relates to corrosion inhibitors, and more specifically corrosion inhibitors for coating compositions. The invention provides for coating compositions that have improved corrosion properties, including reduced flash rust during the application of the coating composition to a metal surface, and even improved corrosion inhibition in the resulting dried coating. The invention also provides for methods of making and using the described the compositions and the corrosion inhibitors thereof.

11 Claims, No Drawings

WATERBORNE COATINGS, COMPOSITIONS, AND METHODS THEREOF THAT PROVIDE IMPROVED CORROSION PROTECTION

FIELD OF THE INVENTION

The invention relates to corrosion inhibitors, and more specifically corrosion inhibitors for coating compositions. The invention provides for coating compositions that have improved corrosion properties, including reduced flash rust during the application of the coating composition to a metal surface, and even improved corrosion inhibition in the resulting dried coating. The invention also provides for methods of making and using the described the compositions and the corrosion inhibitors thereof.

BACKGROUND OF THE INVENTION

The present invention is directed to a corrosion-inhibiting composition and to a method of protecting metallic surfaces from corrosion using the same, and more specifically corrosion inhibitors for coating compositions, and the coating compositions containing such corrosion inhibitors.

Metal surfaces can undergo very rapid corrosion, sometimes even within very short windows of exposure to certain conditions. Significant corrosion can occur in mere minutes or hours depending upon the conditions, and particularly when the metal surfaces are in contact with aqueous solutions, particularly acidic solutions, with highly ionic solutions, and even with hard water. This rapid corrosion is commonly referred to as "flash rust" in the case of ferrous metal surfaces, but is equally a problem with non-ferrous metal surfaces as well. The term "flash rust" as used below refers to the rapid corrosion whether the materials involved are ferrous or non-ferrous.

Not all flash rust is readily visible, yet the presence of any such corrosion can be harmful and can be generally detected upon more in-depth analysis. Flash rust and other forms of corrosion can be particularly problematic in the manufacture of metallic components for various uses when the components will come in contact with aqueous solutions during fabrication, assembly or subsequent testing or use.

There is an ongoing need to reduce, and if possible prevent, flash rust from occurring. There is also an ongoing need to reduce other types of corrosion so that surfaces and parts may last longer and not experience premature failures due to corrosion-related damage.

Commercially available corrosion inhibitors often have low water solubility, such as metallic sulfonates, pigment compositions containing heavy metal salts (e.g., zinc) of carboxylic acids, benzoates, nitrites and nitrates. In addition, flash rust inhibitors formed with nitrites and nitrates have limited use as long-term corrosion inhibitors in direct to metal applications as the toxicity of these corrosion inhibitors make them less attractive for commercial use.

In addition, while nitrites and nitrates mixed with amines are effective flash rust inhibitors, they can react to form N-nitrosamines, which are known carcinogens.

Consequently, a need exists for a corrosion inhibitor for coating compositions that provides early flash rusting protection, and which may also provide long-term corrosion protection. There is also a need for corrosion inhibitors that provide the desired performance in coating compositions while also being cost effective, free of heavy metals, free of nitrites, free of solvents, free of toxic and/or environmentally unfriendly materials, or any combination thereof. The corrosion inhibitors ideally would not absorb oil and could be added directly to coatings compositions, such that the coating composition provides early flash rusting protection and even long-term corrosion protection to the surface the coating is applied to. Or the CI could be made inside in-situ.

In light of the above discussion and problems being encountered, there is a continuing need for advancements in the relevant fields, including improved coating and methods for treating these and other metallic components to reduce flash rust or corrosion and also to deal with it if it occurs. The present invention is addressed to these needs.

SUMMARY OF THE INVENTION

The present invention deals with a waterborne coating composition that includes a corrosion inhibiting component containing a first complexing agent, which includes a trialkanol amine, and a second complexing agent, which includes a carboxylic acid. The invention provides for coating compositions that contain water, a polymer resin component, and the described corrosion inhibiting component, and also optionally allows for various additional additives.

The invention also provides for the corrosion inhibiting component itself, containing a first complexing agent, which includes a trialkanol amine, and a second complexing agent, which includes a carboxylic acid.

The invention provides for a method of reducing flash rusting during the application of a coating to a metal surface, said method comprising the steps of: (i) preparing a coating composition that includes a corrosion inhibiting component comprising a first complexing agent comprising an trialkanol amine and a second complexing agent comprising a carboxylic acid; and (ii) applying the coating composition to a metal surface; resulting in a coating on the metal surface that reduces flash rusting during the application and which provides improved corrosion prevention performance. The invention also provides for a method of improving the corrosion prevention properties of a coating said method comprising the same steps described above. The invention also provides for a method of reducing flash rusting during the application of a coating to a metal surface and also improving the corrosion prevention properties of a coating said method comprising the same steps described above.

The invention provides a process of producing a waterborne coating composition containing a corrosion inhibitor component comprising the steps of: (i) mixing together water, a first complexing agent comprising an trialkanol amine, and a second complexing agent comprising a carboxylic acid, to form a corrosion inhibitor component; (ii) adding the corrosion inhibitor component to a waterborne coating composition; wherein the resulting waterborne coating composition (i) reduces flash rusting during the application of the coating to a metal surface, (ii) provides a coating with improved corrosion prevention performance, or (iii) both (i) and (ii).

The invention also provides for the use of the described corrosion inhibiting component as a flash rust inhibitor in a waterborne coating. The invention further provides for the use of the described corrosion inhibiting component to improve the corrosion prevention properties of a coating. The invention further provides for the use of the described corrosion inhibiting component as a flash rust inhibitor in a waterborne coating and also to improve the corrosion prevention properties of a coating.

In any of the embodiments described herein, the invention provides that the carboxylic acid of the second complexing agent may be one or more dicarboxylic acids containing from 3 to 50 carbon atoms. The trialkanol amine of the first complexing agent may be a tertiary monoamine with three identical alkanol groups attached to the nitrogen atom, where the trialkanol amine contains from 6 to 42 carbon atoms.

The invention further provides for the described coating composition where the first complexing agent is a mixture of amines that is more than 80 percent by weight trialkanol amines. The first complexing agent may be a mixture of one or more trialkanol amines, or it may be single trialkanol amine, substantially free of any other amines, including any other trialkanol amines.

The invention further provides that the weight ratio of the first complexing agent to the second complexing agent of the corrosion inhibitor component, in any embodiment described herein, may be from 1:9 to 9:1.

DETAILED DESCRIPTION OF THE INVENTION

Various preferred features and embodiments will be described below by way of non-limiting illustration.
The Coating Composition The present invention includes coating compositions that contain the described corrosion inhibiting component. More specifically, the invention deals with waterborne coating compositions that include a corrosion inhibiting component.

The coating compositions of the invention are not overly limited so long as they contain the described corrosion inhibiting component. In some embodiments, the coating compositions of the invention are those that are applied to and/or used on metal surfaces, and so which need to minimize and/or reduce flash rusting, and optionally further minimize and/or reduce long term corrosion of the surface. The coating compositions of the invention optionally provide the desired performance in coating compositions while also being cost effective, free of heavy metals, free of nitrites, free of solvents, free of toxic and/or environmentally unfriendly materials, or any combination thereof.

In some embodiments, the coating compositions of the invention include (i) water which may also be referred to as a thinner, (ii) a polymer resin component, and (iii) the described corrosion inhibiting component. In some embodiments the coating compositions of the invention include (i) water, (ii) a polymer resin component, (iii) the described corrosion inhibiting component, and (iv) a pigment and/or dye (where as used herein pigment may include dyes). In some embodiments, the coating compositions of the invention include (i) water, (ii) a polymer resin component, (iii) the described corrosion inhibiting component, and (iv) a defoamer. In some embodiments, the coating compositions of the invention include (i) water, (ii) a polymer resin component, (iii) the described corrosion inhibiting component, and (iv) a pigment and/or dye. In some embodiments, the coating compositions of the invention include (i) water, (ii) a polymer resin component, (iii) the described corrosion inhibiting component, (iv) a defoamer, and (v) a pigment and/or dye. In any of these embodiments, the coating composition may also include one or more additional additives, including for example a reheology modifier, a hindered amine light scatterer, a ultra violet inhibitor, a wetting agent, a flow modifier, a wax emulsion, a coalescing agent, a plasticizer, or combinations thereof.

In some embodiments, the coating compositions of the invention are pigmented and/or dyed and contain a pigment and/or dye component. In some embodiments, the coating compositions of the invention are non-pigmented and/or non-dyed and are substantially free of any pigment and/or dye component, or entirely free of any pigment and/or dye component, or in other embodiments have no intentionally added pigment and/or dye components.

In some coating compositions of the invention are water-based paints, for example, water-based paints for maintenance coating of metals such as bridges, ships, metal pipes and railings, subway and like structures, metal buildings, pipes and conduits for conveying fluids, storage tanks, and the like. Examples of these water-based paints are emulsion polymers of vinyl acetate, styrene, styrene-butadiene, vinyl acetate-vinyl chloride, acrylonitrile-butadiene, isoprene, vinylidene chloride-acrylonitrile, vinylidene chloride-vinyl acetate, vinyl chloride-acrylonitrile, acrylic acid ester and methacrylic acid ester polymers and copolymers thereof with other vinyl monomers, carboxylated synthetic and natural rubbers, and so forth. Other useful and well-known water-based paints include the epoxies, alkyds, phthalic alkyds, emulsified drying oils, polystyrene, and the like. The nature of the film-former and paint are believed to be immaterial to the invention that is any water-based paint, particularly coatings for ferrous metals, may benefit from the invention.

Any of the coating compositions of the invention may optionally further include one or more additional additives. These additional additives may include one or more additional thinners, dispersants, wetting agents, coalescing solvents, pigments/dyes and/or pigment/dye dispersants (if the coating composition is pigmented/dyed), defoamers (if not already present), fillers, plasticizers, solubility aids, thickeners, pH adjustors also referred to as buffers, ultra violet inhibitors, or any combination thereof.

Suitable defoamers, for example, include polyglycol and silicon defoamers. Commercially available polyglycol defoamers suitable for use in the present invention include, for example, two products sold under the name Pluronic® by BASF® and as Q2-3183A by Dow Corning®. Non-limiting examples of suitable silicon defoamers also available include the following: dimethylpolysiloxane hydrolyzate; alpha-methyl-omega-methoxypolydimethylsiloxane; polydimethyl silicone oil; poly(dimethylsiloxane); polydimethylsiloxane, methyl end-blocked; polyoxy(dimethylsilylene), alpha-(trimethylsilyl)-omega-hydroxy; poly[oxy(dimethylsilylene)], alpha-[trimethylsilyl]-omega-[(trimethylsilyl)oxy]; silicone oils; alpha-(trimethylsilyl)poly[oxy(dimethylsilylene)]-omega-methyl; and mixtures thereof. The preferred composition can include such defoamers in varying numbers and amounts sufficient to inhibit foaming during use in treating a metal surface, whether that is in a bath, spray or other method of application. Such defoamers can also be particularly beneficial during addition of the various other components in the composition such as the basic component, the imidazoline component, and the azole component, or any other of the components used in the compositions herein. In selected preferred embodiments, such defoamers can be present in an amount between about 0.01 and about 1.0 wt % of the composition suitable to accomplish the beneficial effect intended.

Suitable pH adjustors include inorganic bases, such as, sodium hydroxide and potassium hydroxide, as well as known or commonly used buffering agents such as phosphates and borates.

Suitable dispersants, which may also be referred to as surfactants, include alkyl sulfonates, acryl sulfonates, phosphate esters, sulfosuccinates, acetylenic glycol, ethoxylated alcohols, and combination thereof. Commercially available examples of such a surfactant suitable for use in the present invention include Solsperse™ surfactants available from the Lubrizol Corporation, and NF-12 surfactants by the Stepan Company. When included, such surfactants can be preferably provided in an amount up to 1 percent by weight and range between 0.1 and 1 percent by weight. When used in this way, such surfactants can add to and provide good wetting ability to enhance the wetting of the metal surface with and for the other ingredients of the overall composition.

In some embodiments, the coating composition is an acrylic emulsion, including styrene acrylic emulsions. In some embodiments, the coating composition is substantially free of, or even completely free of, halides, for example chloride. In some embodiments, the coating composition is not a vinylidene chloride emulsion. The emulsion and coating composition described above generally refer to a monomer, for example, styrene and vinylidene. It is understood that these compositions contain polymerized material, and so may also be referred to as polystyrene acrylic emulsions, polyvinylidene chloride emulsions, and the like.

The Corrosion Inhibitor Component

The corrosion inhibiting component of the invention comprises a first complexing agent and a second complexing agent. The first complexing agent contains a trialkanol amine. The second complexing agent contains a carboxylic acid. The corrosion inhibiting component may also include some amount of water to allow the complexing agents to form a salt with one another. While not wishing to be bound by theory, it is believed the specific amine type used in the first complexing agent in combination with the specific types of acids described, allows for the improved and surprising performance achieved by the invention, and which cannot be obtained when the specified amines are not used, and/or when significantly different acids are used.

The first complexing agent contains a trialkanol amine. The first complexing agent may be a mixture of amines, for example, a mixture of two or more trialkanol amines. The first complexing agent may also me a mixture of amines that includes at least one trialkanol amine. In other words, other amines including non-trialkanol amines may be present in the first complexing agent. However the first complexing agent does contain a trialkanol amine.

In some embodiments, the first complexing agent is at least 50 percent by weight trialkanol amine, in other embodiments the first complexing agent is at least 60, 70, 80, 90 or even 95 percent by weight trialkanol amine. In still other embodiments, the first complexing agent essentially consists of one or more trialkanol amines, and may be substantially free of any other amines. By substantially free of it is meant that any other amines are only present in the first complexing agent in amounts typical of industrial materials. In other words, if a commercially available industrial material is considered to be made up of one or more trialkanol amines, it may be considered to be substantially free of any other amines as long as other amines were not intentionally added and/or the amount of other amines do not exceed the amount that may be present due to typical contamination or due to the presence of byproducts, etc.

In some embodiments, and as used herein, one material may be considered to be substantially free of a second material if it contains no more than 5, 4, 2, 1 or even 0.5 percent by weight of the second materials.

Suitable trialkanol amines include amines tertiary monoamines, that is an amine containing a single nitrogen atom and three alkanol groups, for example three hydrocarbyl groups containing a hydroxy group, or in some embodiments three alkyl groups containing a hydroxy group. These trialkanol amines may contain from 3 to 42 carbon atoms total, or from 4 to 30 or from 5 to 18, 6 to 12, 6 to 9 or even just 6 carbon atoms. In some embodiments, the trialkanol amines have identical alkanol groups that is three hydrocarbyl or alkyl groups that contain a hydroxy group are identical. This, in some embodiments, the trialkanol amines of the first complexing agent is a tertiary monoamine with three identical alkanol groups attached to the nitrogen atom, wherein the trialkanol amine contains from 3 to 42 carbon atoms, or any of the other ranges discussed above.

In some embodiments, the trialkanol amines of the first complexing agent is represented by the formula:

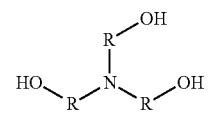

wherein each R is independently a hydrocarbyl group such that the amine contains from 6 to 42 carbon atoms, or from 6 to 120, 6 to 18, 6 to 12, 6 to 9 or even 6 carbon atoms. In other embodiments, the R groups may be defined as each containing from 2 to 40 carbon atoms, or from 3 to 39, 4 to 38, 5 to 37, or 6 to 36 carbon atoms. In other embodiments, the R groups may be defined as each containing from 2 to 14 carbon atoms, or from 2 to 10, 2 to 6, 2 to 4, 2 to 3, or even just 4, 3, or 2 carbon atoms. In some embodiments, the R groups in the formula above are alkyl groups (or rather alkylene groups). In some embodiments, the R groups in the formula above are identical alkylene groups each containing the same number of carbon atoms. The R groups may be linear or branched, however, in some embodiments the R groups in the formula above are linear alkylene groups.

Suitable examples of trialkanol amines suitable for use in the present invention include triethanol amine, tripropanol amine, tributanol amine, tripentanol amine, trihexanol amine, or mixtures thereof. In some embodiments the trialkanol amine of the invention is triethanol amine, tripropanol amine, or some combination thereof. In other embodiments the trialkanol amine of the invention is triethanol amine. In still other embodiments, the trialkanol amine of the invention is tripropanol amine, or some combination thereof.

The second complexing agent contains a carboxylic acid. Suitable carboxylic acids for use in the invention are not believed to be overly limited. In some embodiments, the second complexing agent includes one or more dicarboxylic acids. In some embodiments, the second complexing agent includes one or more carboxylic acids that contain from 3 or 4 up to 50 carbon atoms, or from 4 to 40, 8 to 20, 10 to 12, or even 11 to 12 carbon atoms. In some embodiments, the second complexing agent includes one or more dicarboxylic acids that contain from 3 to 50 carbon atoms, or from 4 to 40, 8 to 20, 10 to 12, or even 11 to 12 carbon atoms.

In some embodiments, the second complexing agent includes at least one dicarboxylic acid. In certain embodiments, the second complexing agent includes a mixture of two, three or more dicarboxylic acids. One commercially available example of such a mixture of dicarboxylic acids suitable for use in the present invention is sold under the trademark Corefree® M-1 by Invista®.

Suitable carboxylic acids include linear carboxylic acids, branched carboxylic acids, or combinations thereof, and in some embodiments, linear dicarboxylic acids, branched dicarboxylic acids, or combinations thereof. In some embodiments, the carboxylic acids are aliphatic, that is they do not contain any aromatic groups.

In some embodiments, the second complexing agent may include one or more dicarboxylic acids represented by the formula:

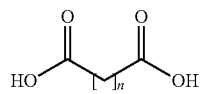

wherein n is from 2 to 48. In some embodiments, n is from 3 to 38, or from 6 to 18, 7 to 10, 8 to 10, or even 9 to 10.

In some embodiments, the second complexing agent is substantially free of, as defined above, or even completely free of, monocarboxylic acids. In some embodiments, the second complexing agent is substantially free of, as defined above, or even completely free of, branched carboxylic acids, that is branched monocarboxylic acids, branched dicarboxylic acids, or both.

Suitable acids include malonic acid, succinic acid, glutaric acid, adipic acid, heptanedioic acid, octanedioic acid, decanedioic acid, undecanedioic acid, dodecanedioic acid, tridecanedioic acid, tetradecanedioic acid, or some combination thereof. In some embodiments, the acid contains decanedioic acid, undecanedioic acid, dodecanedioic acid, or some combination thereof.

In some embodiments, the second complexing agent includes sebacic acid, decanedioic acid, undecanedioic acid, dodecanedioic acid, 2-dodecenedioic acid, 3-tert-butyladipic acid, 1,1-cyclohexanediacetic acid, and mixtures and/or salts of these same acids.

In some embodiments, the waterborne coating composition described above includes (i) a first complexing agent that includes triethanol amine, tripropanol amine, tributanol amine, tripentanol amine, trihexanol amine, or some combination thereof, and (ii) a second complexing agent that includes malonic acid, succinic acid, glutaric acid, adipic acid, heptanedioic acid, octanedioic acid, decanedioic acid, undecanedioic acid, dodecanedioic acid, tridecanedioic acid, tetradecanedioic acid, or some combination thereof.

In any of the embodiments described above, the first complexing agent can be mixture of amines that includes one or more trialkanol amines. In some of these embodiments, the mixture of amines is more than 80 percent by weight trialkanol amines, or more than 85, 90 or even 95 percent by weight trialkanol amines.

In any of the embodiments described above, the first complexing agent can be mixture of amines that includes one or more trialkanol amines where the alkanol groups of the amine are linear. In some of these embodiments, the mixture of amines is more than 80, 85, 90 or even 95 percent by weight of these trialkanol amines.

In any of the embodiments described above, the first complexing agent can be mixture of amines that includes one or more trialkanol amines where the alkanol groups of the amine are identical linear alkanol groups. In some of these embodiments, the mixture of amines is more than 80, 85, 90 or even 95 percent by weight of these trialkanol amines.

In the described waterborne coating compositions, the weight ratio of the first complexing agent to the second complexing agent may be from 1:9 to 9:1. In some embodiments, the weight ratio of the first complexing agent to the second complexing agent is from 1:5 to 5:1, 1:4 to 4:1, 2:3 to 3:2, or even about 3:2, about 1:1, or about 2:3.

In the described waterborne coating compositions, the corrosion inhibiting component may be present from 0.1 to 30 percent by weight over the overall composition, or from 0.1 or 0.25 or 0.5 up to 20 or 10 or 5 percent by weight, or even from 0.1 to 2.0, or 0.25 to 2.0, or 0.5 to 1.5, or even about 1.0 percent by weight.

In some embodiments, in the described waterborne coating compositions, the second complexing component may be present in the overall composition up to 15 percent by weight, or from 0.1 or 0.2 or 0.5 up to 15 or 10 or 5 or 2 percent by weight. Similarly, in some embodiments, the first complexing component may be present in the overall composition up to 15 percent by weight, or from 0.1 or 0.2 or 0.5 up to 15 or 10 or 5 or 2 percent by weight.

In some embodiments, the first complexing agent, and/or the overall corrosion inhibiting component, is substantially free of, or even completely free of sodium nitrite salts. In some embodiments, the second complexing agent, and/or the overall corrosion inhibiting component, is substantially free of, or even completely free of sulfur containing carboxylic acids, for example, arylsufonamido carboxylic acids. In some embodiments, the corrosion inhibiting component, is substantially free of, or even completely free of wax emulsions. The invention does not require the presence of these types of materials in order to provide the benefits described.

In some embodiments, the first complexing agent, and/or the overall corrosion inhibiting component, is substantially free of, or even completely free of azoles (for example, benzotriazole, tolyltriazole and mercaptobenzothiazole) and/or imidazolines (for example ethoxylated imidazoline). The invention does not require the presence of these types of materials in order to provide the benefits described.

In some embodiments, the first complexing agent, and/or the overall corrosion inhibiting component, is substantially free of, or even completely free of phosphonate and/or a polyphosphonate (for examples, organophosphonates, polyaminophosphonates, and polyphosphonic polymers). The invention does not require the presence of these types of materials in order to provide the benefits described.

In some embodiments, the complexing agents, and/or the overall corrosion inhibiting component, is substantially free of, or even completely free of metals and/or metal salts, for example polyvalent metal ions. In some embodiments, the compositions may be described as environmentally friendly in that they generally do not contain volatile organic compounds and as such are considered "low-VOC" or "VOC-free" in that they generally contain very low amounts of volatile organic chemicals or even no measurable volatile organic chemicals.

In some embodiments, the complexing agents, and/or the overall corrosion inhibiting component, is substantially free of, or even completely free of organic acids such as sorbic acid, lactic acid, and citric acid, as well as salts and/or derivatives such acids, including potassium and sodium salts thereof.

In some embodiments, the complexing agents, and/or the overall corrosion inhibiting component, is substantially free of, or even completely free of natural gums or waxes such as beeswax, vegetable wax and/or extracts or derivatives thereof, including for example paraffin, orange peel wax, xanthan gum, and carrageenan.

In some embodiments, the complexing agents, and/or the overall corrosion inhibiting component, is substantially free of, or even completely free of aromatic carboxylic acids, for example benzoic acid.

In some embodiments, the first complexing agents, and/or the overall corrosion inhibiting component, is substantially free of, or even completely free of primary amines and/or secondary amines. In some embodiments, the first complexing agents, and/or the overall corrosion inhibiting component, is substantially free of, or even completely free of primary alkanol amines and/or secondary alkanol amines.

INDUSTRIAL APPLICATION

The present invention includes various methods and uses for the described waterborne coating compositions as well as the corrosion inhibiting additive package used therein.

The described compositions find particular advantageous use on ferrous metal surfaces such as steel and cast iron, although many non-ferrous metal surfaces can derive protection and thereby benefit from the described compositions as well.

The invention includes a method of reducing flash rusting during the application of a coating to a metal surface. As noted above, flash rusting can occur very quickly, especially when using waterborne coating compositions to apply to a coating to a metal surface. The invention provides a method, utilizing the described compositions, that reduces, and in some instances even eliminates flash rusting during the application of such coatings.

The method of reducing flash rusting includes the steps of (i) preparing a coating composition that includes a corrosion inhibiting component comprising a first complexing agent comprising an trialkanol amine and a second complexing agent comprising a carboxylic acid; and (ii) applying the coating composition to a metal surface. The method results in a coating on the metal surface that reduced and/or reduces flash rusting during the application of the coating. In some embodiments, the method additionally results in a coating that provides improved corrosion prevention performance, where the improved performance continues even after the coating has dried. Any of the coating compositions described above may be used in this described method.

The invention also provides for a process of producing a waterborne coating composition containing the described corrosion inhibitor component. This process includes the steps of: (i) mixing together water, a first complexing agent comprising a trialkanol amine, and a second complexing agent comprising a carboxylic acid, to form a corrosion inhibitor component; and (ii) adding the corrosion inhibitor component to a waterborne coating composition. The corrosion inhibitor component may also be made in situ. The resulting waterborne coating composition can reduce flash rusting during the application of the coating to a metal surface. In some embodiments, the resulting composition additionally provides a coating with improved corrosion prevention performance, where the improved performance continues even after the coating has dried. Any of the coating compositions described above may be used in this described method.

Said another way, the invention also provides for a method for treating metal surfaces to inhibit corrosion, comprising the steps of mixing, diluting and contacting or otherwise applying the above composition to the metal surface by spraying, dipping, coating or other effective means. Such methods include the step of contacting or otherwise treating a metal surface in some manner with one or more of the corrosion-inhibiting compositions, or the coating compositions containing the same, described above. In some embodiments, the composition is formulated to have a pH of between about 7 and about 10. The described methods also include applying the corrosion-inhibiting composition, or the coating composition containing the same, to the metal surface by way of flushing the composition through an otherwise closed fluid system, by dipping or immersing the metal part in a heated or unheated bath containing the composition, or by spraying or otherwise painting the composition on the metal part using a technique appropriate under the circumstances. In yet other embodiments, the method may further include storing, transporting or using the treated metal part or drying the treated part to form a coating of the composition that is dry to the touch and protects against corrosion thereafter.

The invention also provides for the use of the described corrosion inhibiting component as a flash rust inhibitor in a waterborne coating composition. The invention also provides for the use of the described corrosion inhibiting component to improve the corrosion prevention performance of a coating that includes the component, where the performance continues even after the coating has dried. Any of the corrosion inhibiting components described above may be used in this described use.

As noted above, the invention also provides for a corrosion inhibiting component itself, that is an additive package, and more specifically an additive package for a waterborne coating composition. The corrosion inhibiting component includes a first complexing agent comprising a trialkanol amine and a second complexing agent comprising a carboxylic acid. The corrosion inhibiting component may include any of the first complexing agents and second complexing agents described above. The corrosion inhibiting component may also include one or more additional additives and/or be part of a larger additive package that includes one or more additional additives, including any of those described above. The corrosion inhibiting component and/or the additive package in which it is used may also contain one or more solvents and/or diluents, which may also be described as a carrier.

Suitable carriers include aqueous-based fluids, including water and/or an alcohol component. Suitable alcohols include monohydric, dihydric, trihydric or other polyhydric alcohol. Depending on the particular metal part or surface to be treated and the concentration of the overall composition used, varying amounts of the alcohol and water components can be formulated in the composition. For example, in a concentrated form, the preferred composition can include less than about 80 weight percent water overall. In use, this concentrated composition can be diluted up to about a twenty-fold dilution, i.e., about 1:20 (concentrate:water), or even more depending on the application. A ready-to-use formulation of the preferred composition can include from about 50 or even 60 up to about 90 weight percent water depending on the application. The alcohol component can also be added in varying amounts, depending on the metal part or surface treated and whether a concentrate or a ready-to-use formulation is desired. For example, a concentrated formulation can include between about 1 and about 10 weight percent of the alcohol component. This concentrate can be diluted at between about a five and about a ten dilution ratio or more for the ready-to-use formulation. Examples of suitable alcohols include dihydric alcohols, i.e., glycols or diols and trihydric alcohols, such as ethylene glycol, propylene glycol and other glycols including diethylene, triethlyene and the like.

While above references are made to both a concentrated formulation and a ready-to-use formulation, it will be understood that these formulations are proscribed for and by the end user. If desired, the concentrated formulation can be used "as is" depending upon the particular application, environment, method of treatment and types of metal surfaces in need of protection.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring); substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy); hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, in some embodiments no more than one, non-hydrocarbon substituent will be present for every ten carbon atoms in the hydrocarbyl group; typically, there will be no non-hydrocarbon substituents in the hydrocarbyl group. As used herein, the term "hydrocarbonyl group" or "hydrocarbonyl substituent" means a hydrocarbyl group containing a carbonyl group.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

The invention will be further illustrated by the following examples. While the Examples are provided to illustrate the invention, they are not intended to limit it.

Example Set 1

A set of examples is prepared by adding several different corrosion inhibitor components to an unpigmented waterborne coating composition. The baseline waterborne coating composition has a conventional formulation and contains water, a polymer resin, and an additive package, referred to hereafter as Additive Package A. Additive package A includes a defoamer, a dispersant, a thickener, a pH adjustor, and a coalescing agent. The baseline waterborne coating composition does not contain a corrosion inhibitor. The example set includes a baseline sample of the waterborne coating composition, and then a series of examples that are identical to the baseline except that they are each top treated to 1.0 percent with a different corrosion inhibitor. A summary of the examples of Example Set 1 is provided in the table below:

TABLE 1

| Example Set 1 Formulations | | | | | | |
|---|---|---|---|---|---|---|
| | Ex 1-1 | Ex 1-2 | Ex 1-3 | Ex 1-4 | Ex 1-5 | Ex 1-6 |
| Pigment | No | No | No | No | No | No |
| Additive Package | A | A | A | A | A | A |
| Corrosion Inhibitor I[1] | 0.0 | 1.0 | 0.0 | 0.0 | 0.0 | 0.0 |
| Corrosion Inhibitor II[2] | 0.0 | 0.0 | 1.0 | 0.0 | 0.0 | 0.0 |
| Corrosion Inhibitor III[3] | 0.0 | 0.0 | 0.0 | 1.0 | 0.0 | 0.0 |
| Corrosion Inhibitor IV[4] | 0.0 | 0.0 | 0.0 | 0.0 | 1.0 | 0.0 |
| Corrosion Inhibitor V[5] | 0.0 | 0.0 | 0.0 | 0.0 | 0.0 | 1.0 |

[1]Corrosion Inhibitor I is a commercially available corrosion inhibitor marketed by the Raybo ® Chemical Company as RAYBO ® 60, which includes a sodium nitrite amine salt.
[2]Corrosion Inhibitor II is a wax emulsion.
[3]Corrosion Inhibitor III is triethanolamine arylsufonamido carboxylic acid salt.
[4]Corrosion Inhibitor III is salt of a mixture of triisopropanolamine and monoisopropanolamine with a dicarboxylic acid containing from 10 to 12 carbon atoms.
[5]Corrosion Inhibitor III is salt of triethanolamine with a dicarboxylic acid containing from 10 to 12 carbon atoms.

Example Set 2

A second sample set is prepared similar to Example Set 1, however, Example Set 2 is a set of pigmented waterborne coating compositions that uses a different additive package. The baseline waterborne coating composition of Example Set 2 has a conventional formulation and contains water, the same polymer resin used in Example Set 1, and an additive package, referred to hereafter as Additive Package B. Additive package B includes a defoamer, a dispersant, a pigment, a filler, a solubility aid, a thickener, a pH adjustor, and a coalescing agent. A summary of the examples of Example Set 2 is provided in the table below:

TABLE 2

| Example Set 2 Formulations | | | | | | |
|---|---|---|---|---|---|---|
| | Ex 2-1 | Ex 2-2 | Ex 2-3 | Ex 2-4 | Ex 2-5 | Ex 2-6 |
| Pigment | Yes | Yes | Yes | Yes | Yes | Yes |
| Additive Package | B | B | B | B | B | B |
| Corrosion Inhibitor I[1] | 0.0 | 1.0 | 0.0 | 0.0 | 0.0 | 0.0 |
| Corrosion Inhibitor II[2] | 0.0 | 0.0 | 1.0 | 0.0 | 0.0 | 0.0 |
| Corrosion Inhibitor III[3] | 0.0 | 0.0 | 0.0 | 1.0 | 0.0 | 0.0 |
| Corrosion Inhibitor IV[4] | 0.0 | 0.0 | 0.0 | 0.0 | 1.0 | 0.0 |
| Corrosion Inhibitor V[5] | 0.0 | 0.0 | 0.0 | 0.0 | 0.0 | 1.0 |

[1]Corrosion Inhibitor I is a commercially available corrosion inhibitor marketed by the Raybo ® Chemical Company as RAYBO ® 60, which includes a sodium nitrite amine salt.
[2]Corrosion Inhibitor II is a wax emulsion.
[3]Corrosion Inhibitor III is triethanolamine arylsufonamido carboxylic acid salt.
[4]Corrosion Inhibitor III is salt of a mixture of triisopropanolamine and monoisopropanolamine with a dicarboxylic acid containing from 10 to 12 carbon atoms.
[5]Corrosion Inhibitor III is salt of triethanolamine with a dicarboxylic acid containing from 10 to 12 carbon atoms.

Example Set 3

A third sample set is prepared similar to Example Set 1 except that Example Set 3 uses a different polymer resin. Example Set 3 is a set of unpigmented waterborne coating compositions having a conventional formulation that contains water, a polymer resin different from that used in Example Sets 1 and 2, and Additive Package A, described above. A summary of the examples of Example Set 3 is provided in the table below:

TABLE 3

Example Set 3 Formulations

|  | Ex 3-1 | Ex 3-2 | Ex 3-3 | Ex 3-4 | Ex 3-5 | Ex 3-6 |
|---|---|---|---|---|---|---|
| Pigment | No | No | No | No | No | No |
| Additive Package | A | A | A | A | A | A |
| Corrosion Inhibitor I[1] | 0.0 | 1.0 | 0.0 | 0.0 | 0.0 | 0.0 |
| Corrosion Inhibitor II[2] | 0.0 | 0.0 | 1.0 | 0.0 | 0.0 | 0.0 |
| Corrosion Inhibitor III[3] | 0.0 | 0.0 | 0.0 | 1.0 | 0.0 | 0.0 |
| Corrosion Inhibitor IV[4] | 0.0 | 0.0 | 0.0 | 0.0 | 1.0 | 0.0 |
| Corrosion Inhibitor V[5] | 0.0 | 0.0 | 0.0 | 0.0 | 0.0 | 1.0 |

[1]Corrosion Inhibitor I is a commercially available corrosion inhibitor marketed by the Raybo ® Chemical Company as RAYBO ® 60, which includes a sodium nitrite amine salt.
[2]Corrosion Inhibitor II is a wax emulsion.
[3]Corrosion Inhibitor III is triethanolamine arylsufonamido carboxylic acid salt.
[4]Corrosion Inhibitor III is salt of a mixture of triisopropanolamine and monoisopropanolamine with a dicarboxylic acid containing from 10 to 12 carbon atoms.
[5]Corrosion Inhibitor III is salt of triethanolamine with a dicarboxylic acid containing from 10 to 12 carbon atoms.

Example Set 4

A fourth sample set is prepared similar to Example Set 2 however Example Set 4 uses a different polymer resin, the same resin used in Example Set 3. Example Set 4 is a set of pigmented waterborne coating compositions having a conventional formulation that contains water, the polymer resin of Example Set 3, and Additive Package B, described above. A summary of the examples of Example Set 4 is provided in the table below:

TABLE 4

Example Set 4 Formulations

|  | Ex 4-1 | Ex 4-2 | Ex 4-3 | Ex 4-4 | Ex 4-5 | Ex 4-6 |
|---|---|---|---|---|---|---|
| Pigment | Yes | Yes | Yes | Yes | Yes | Yes |
| Additive Package | B | B | B | B | B | B |
| Corrosion Inhibitor I[1] | 0.0 | 1.0 | 0.0 | 0.0 | 0.0 | 0.0 |
| Corrosion Inhibitor II[2] | 0.0 | 0.0 | 1.0 | 0.0 | 0.0 | 0.0 |
| Corrosion Inhibitor III[3] | 0.0 | 0.0 | 0.0 | 1.0 | 0.0 | 0.0 |
| Corrosion Inhibitor IV[4] | 0.0 | 0.0 | 0.0 | 0.0 | 1.0 | 0.0 |
| Corrosion Inhibitor V[5] | 0.0 | 0.0 | 0.0 | 0.0 | 0.0 | 1.0 |

[1]Corrosion Inhibitor I is a commercially available corrosion inhibitor marketed by the Raybo ® Chemical Company as RAYBO ® 60, which includes a sodium nitrite amine salt.
[2]Corrosion Inhibitor II is a wax emulsion.
[3]Corrosion Inhibitor III is triethanolamine arylsufonamido carboxylic acid salt.
[4]Corrosion Inhibitor III is salt of a mixture of triisopropanolamine and monoisopropanolamine with a dicarboxylic acid containing from 10 to 12 carbon atoms.
[5]Corrosion Inhibitor III is salt of triethanolamine with a dicarboxylic acid containing from 10 to 12 carbon atoms.

All of the examples in the example sets described above are tested to evaluate their ability to reduce flash rusting and also to evaluate the corrosion prevention performance of the coatings made from the examples. The tests used to evaluate the samples are described below.

Flash rust reduction is evaluated by coating a test coupon to give a 1.0 mil thick dry film of the example material, and then allowing the panel to dry. Flash rust was observed within minutes of the coating being applied under ambient conditions (about 60% relative humidity, 22 degrees Celsius). After 15 minutes, the test panels are evaluated for flash rusting and results are reported as a percentage, based on ASTM D610-08, with a 100% result indicating the entire metal surface shows flash rusting and a 0% result indicating no flash rusting was observed at all.

The corrosion prevention performance of the compositions, and/or the coatings made from the compositions, is evaluated by several tests. These tests include (i) a salt spray test carried out according to a modified ASTM B117-09 with testing conditions at 35 degrees Celsius and a 5% salt water solution, running 24 hours a day, (ii) a QUV weathering test carried out according to ASTM G154-06 cycle 1, with ultraviolet light cycle settings of 60 degrees Celsius, 8 hours and 0.89 W/m²/nm, and condensation cycle settings of 50 degrees C. Celsius, 4 hours and dark, running 24 hour per day, and (iii) a Cleveland condensing cabinet (QCT) test carried out according to a modified ASTM D4585-07 with testing conditions at 35 degrees Celsius and 100% relative humidity, running 24 hours a day. The ASTM B117-09 test lasted for 24 hours, the ASTM G154-06 testing lasted for 200 hours, and the ASTM D4585-07 testing lasted for 200 hours. For all of these tests results are reported in percentages and a lower percentage result indicates less corrosion and so better performance. The results from the testing are presented below:

TABLE 5

Test Results

| 5A | Ex 1-1 | Ex 1-2 | Ex 1-3 | Ex 1-4 | Ex 1-5 | Ex 1-6 |
|---|---|---|---|---|---|---|
| Flash Rust | 100% | 0% | Not Tested | 0% | 0% | 0% |
| Salt Spray | 33% | 3.3% | Not Tested | 33% | 3.0% | 0.1% |
| QUV | 100% | 0% | Not Tested | 75% | 0% | 0% |
| QCT | 100% | 0% | Not Tested | 0.1% | 0.03% | 0.03% |

| 5B | Ex 2-1 | Ex 2-2 | Ex 2-3 | Ex 2-4 | Ex 2-5 | Ex 2-6 |
|---|---|---|---|---|---|---|
| Flash Rust | 100% | 0% | 100% | 0% | 0% | 0% |
| Salt Spray | 90% | 75% | 50% | 70% | 50% | 50% |
| QUV | 0.3% | 0.3% | 3% | 16% | 0.3% | 0% |
| QCT | 1.0% | 1.3% | 0.3% | 33% | 10% | 0.03% |

TABLE 5-continued

| 5C | Ex 3-1 | Ex 3-2 | Ex 3-3 | Ex 3-4 | Ex 3-5 | Ex 3-6 |
|---|---|---|---|---|---|---|
| Flash Rust | 100% | 0% | Not Tested | 0% | 0% | 0% |
| Salt Spray | 0.4% | 1.1% | Not Tested | 33% | 0.13% | 0.3% |
| QUV | 0% | 0% | Not Tested | 0% | 0% | 0% |
| QCT | 100% | 10% | Not Tested | 0.3% | 0.03% | 0.03% |

| 5D | Ex 4-1 | Ex 4-2 | Ex 4-3 | Ex 4-4 | Ex 4-5 | Ex 4-6 |
|---|---|---|---|---|---|---|
| Flash Rust | 0.3% | 0% | Not Tested | 0% | 0% | 0% |
| Salt Spray | 16% | 1.0% | Not Tested | 4.0% | 0.03% | 50% |
| QUV | 1.0% | 0.3% | Not Tested | 0.03% | 0% | 0% |
| QCT | 3.3% | 0.1% | Not Tested | 0.03% | 0% | 0% |

The results show the compositions of the present invention provide good protection against flash rusting compared to the baseline examples that did not contain any corrosion inhibiting component, and at least as good protection against flash rusting compared to examples containing other corrosion inhibiting components. The results also show that the compositions of the present invention provide coatings with improved corrosion protection performance compared both the baseline (see Examples 1-1, 2-1, 3-1, and 4-1) and other commercially available corrosion inhibitors such as Corrosion Inhibitor I (see Examples 1-2, 2-2, 3-2, and 4-2). Examples containing Corrosion Inhibitor IV (see Examples 1-5, 2-5, 3-5, and 4-5) and Corrosion Inhibitor V (see Examples 1-6, 2-6, 3-6, and 4-6) in particular showed an overall improved performance across multiple corrosion tests while still providing excellent protection against flash rusting. Of these examples with good performance, the results show that the examples containing Corrosion Inhibitor V showed the best overall combination of performance and properties.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Except where otherwise indicated, all numerical quantities in the description specifying amounts or ratios of materials are on a weight basis. Unless otherwise indicated, each chemical or composition referred to herein should be interpreted as being a commercial grade material which may contain the isomers, byproducts, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

What is claimed is:

1. A waterborne coating composition comprising:
    (i) water;
    (ii) a polymer resin component; and
    (iii) a corrosion inhibiting component,
        wherein said corrosion inhibiting component comprises a first complexing agent comprising an trialkanol amine and a second complexing agent comprising a carboxylic acid;
        said coating composition being a water-based paint, comprising an emulsion polymer of vinyl acetate, styrene, styrene-butadiene, vinyl acetate-vinyl chloride, acrylonitrile-butadiene, isoprene, vinylidene chloride-acrylonitrile, vinylidene chloride-vinyl acetate, vinyl chloride-acrylonitrile, acrylic acid ester or methacrylic acid ester polymers or copolymers thereof with other vinyl monomers, or carboxylated synthetic or natural rubber.

2. The waterborne coating composition of claim 1 wherein the second complexing agent comprises one or more dicarboxylic acids containing from 3 to 50 carbon atoms.

3. The waterborne coating composition of claim 1 wherein the second complexing agent comprises one or more dicarboxylic acids represented by the formula:

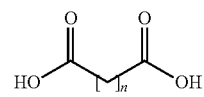

wherein n is from 1 to 48.

4. The waterborne coating composition of claim 1 wherein the trialkanol amine of the first complexing agent comprises a tertiary monoamine with three identical alkanol groups attached to the nitrogen atom, containing from 6 to 42 carbon atoms.

5. The waterborne coating composition of claim 1 wherein the trialkanol amine of the first complexing agent is represented by the formula:

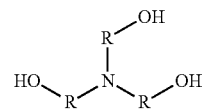

wherein each R is independently a hydrocarbylene group containing from 2 to 42 carbon atoms.

6. The waterborne coating composition of claim 1:
    wherein the trialkanol amine of the first complexing agent comprises: triethanol amine, tripropanol amine, tributanol amine, tripentanol amine, trihexanol amine, or some combination thereof; and wherein the carboxylic acid of the second complexing agent comprises: malonic acid, succinic acid, glutaric acid, adipic acid, heptanedioic acid, octanedioic acid, decanedioic acid, undecanedioic acid, dodecanedioic acid, tridecanedioic acid, tetradecanedioic acid, or some combination thereof.

7. The waterborne coating composition of claim 1 wherein the first complexing agent comprises a mixture of amines including one or more trialkanol amines, wherein the mixture of amines is more than 80 percent by weight trialkanol amines.

8. The waterborne coating composition of claim 1 wherein the first complexing agent comprises a trialkanol amine and is substantially free of any other amines.

9. The waterborne coating composition of claim 1 wherein the weight ratio of the first complexing agent to the second complexing agent is from 1:9 to 9:1.

10. A method of reducing flash rusting during the application of a coating to a metal surface, said method comprising the steps of:
 (i) preparing a coating composition that includes:
  (a) water;
  (b) a polymer resin component; and
  (c) a corrosion inhibiting component comprising a first complexing agent comprising an trialkanol amine and a second complexing agent comprising a carboxylic acid; and
 (ii) applying the coating composition to a metal surface;
said coating composition being a water-based paint, comprising an emulsion polymer of vinyl acetate, styrene, styrene-butadiene, vinyl acetate-vinyl chloride, acrylonitrile-butadiene, isoprene, vinylidene chloride-acrylonitrile, vinylidene chloride-vinyl acetate, vinyl chloride-acrylonitrile, acrylic acid ester or methacrylic acid ester polymers or copolymers thereof with other vinyl monomers, or carboxylated synthetic or natural rubber;
 resulting in a coating on the metal surface that reduces flash rusting during the application.

11. A process of producing a waterborne coating composition containing a corrosion inhibitor component comprising the steps of:
 (i) mixing together water, a first complexing agent comprising an trialkanol amine, and a second complexing agent comprising a carboxylic acid, to form a corrosion inhibitor component;
 (ii) adding the corrosion inhibitor component to a waterborne coating composition that comprises (a) water and (b) a polymer resin component; or forming the corrosion inhibitor in situ;
said coating composition being a water-based paint, comprising an emulsion polymer of vinyl acetate, styrene, styrene-butadiene, vinyl acetate-vinyl chloride, acrylonitrile-butadiene, isoprene, vinylidene chloride-acrylonitrile, vinylidene chloride-vinyl acetate, vinyl chloride-acrylonitrile, acrylic acid ester or methacrylic acid ester polymers or copolymers thereof with other vinyl monomers, or carboxylated synthetic or natural rubber
wherein the resulting waterborne coating composition reduces flash rusting during the application of the coating to a metal surface.

\* \* \* \* \*